May 24, 1932.    A. A. GODFREY    1,860,242

MANUFACTURE OF LINOLEUM

Filed Dec. 3, 1929    6 Sheets-Sheet 1

May 24, 1932.　　A. A. GODFREY　　1,860,242
MANUFACTURE OF LINOLEUM
Filed Dec. 3, 1929　　6 Sheets-Sheet 3

INVENTOR
A. A. Godfrey
BY
His ATTORNEY.

Patented May 24, 1932

1,860,242

UNITED STATES PATENT OFFICE

ALFRED ARTHUR GODFREY, OF LONDON, ENGLAND, ASSIGNOR TO LINOLEUM MANUFACTURING COMPANY LIMITED, OF LONDON, ENGLAND, A COMPANY OF GREAT BRITAIN

MANUFACTURE OF LINOLEUM

Application filed December 3, 1929, Serial No. 411,298, and in Great Britain December 12, 1928.

This invention relates to improvements in the manufacture of linoleum, and particularly to linoleum having a patterned surface.

The object of the present invention is to provide means for positioning (on a canvas or other suitable backing) the tesseræ or sections which form the pattern.

In one way of carrying out the invention, we provide a plurality of strips of linoleum for each kind of tessera or section, e. g. if the patterned surface is to consist of black and white tesseræ, there is a plurality of strips of black linoleum and a plurality of strips of white linoleum.

Means are provided for feeding the necessary strips to form the pattern at any given part, step by step, those strips which are not required to form the pattern at that part remaining stationary.

After each forward movement of the strips, portions thereof are cut off by a guillotine to form the tesseræ.

The strips forming the different kinds of tesseræ are preferably conducted in guides, arranged one below the other, to a table leading to the guillotine.

On the far side of the guillotine is a travelling background on to which the tesseræ severed by the guillotine are pushed by the strips on the next step by step motion.

After the tesseræ have been placed in position, they are submitted to pressure in any ordinary manner to consolidate the linoleum.

The selection of the strips to form the tesseræ is effected by jacquard or other suitable mechanism.

In one form of construction, a plurality of reels of strips of linoleum to form one kind of tesseræ, for example, black tesseræ, are rotatably mounted on a spindle and a similar number of strips of linoleum to form another kind of tesseræ, for example, white tesseræ, are rotatably mounted on another spindle. The strips are led from the reels to feed-discs, to which a step by step motion can be imparted by means of tappets carried by oscillating arms located within the discs. The tappets are provided with springs, adapted to force them radially outward to engage holes in the discs and are also provided with a shoulder adapted to be engaged by one or more spring actuated jaws which can be opened by means of solenoids when energized by means controlled by jacquard mechanism.

After the tappets have actuated the discs, they are re-set by push rods. The discs, when actuated to feed the strips, are rotated an amount which will advance the strips a certain distance and are then rotated in the opposite direction to return the strips a smaller distance, the difference between the distances being equal to the length of a tesseræ.

The strips coming from the discs are led through guides to a table or bed on which a guillotine is mounted.

If it be desired to turn some or all of the tesseræ through an angle, this is effected by means of plungers which are adapted to pass through holes in the table. The tesseræ to be turned are lifted by the plungers to which a turning movement is then imparted, the plungers being then withdrawn to allow the tesseræ to take up their turned position on the table.

The invention is illustrated in the accompanying drawings, in which.

1 is the frame of the machine which supports spindles, 2, 3 on each of which is mounted a plurality of reels, 4, 5 of linoleum, the reels 4 being adapted to form one kind of tesseræ and the reels 5 another kind. The ends of each reel are led downwardly through guide blocks 6, 7, between a series of discs 8, 9 and endless bands 10, 11 passing over guide rolls, 12, 13 mounted in frames 14, 15, one disc and band being provided for each strip. The ends of the strips then pass through guideways formed between guides 16, 17.

The discs 8, 9 of each series are mounted on rollers 18 carried on plates 19 secured to a frame 20 rotatably mounted on the frame 1 and oscillated in the manner hereinafter described. The frame 20 carries electromagnets 21, one for each disc, adapted to co-operate with armatures 22 pivoted at 23 to a bracket 24 secured to the frame 20. Each armature is formed with a lever extension 25 having a beak 26 adapted normally to engage a shoulder formed on a spring-urged driving pin 27 slidably mounted in the plates 19 and frame 20. The pin 27 is adapted to enter holes 28, 29 formed respectively in the series 8, 9 of the discs.

Located at one side of each series of discs are frames 30, 31 in each of which are mounted locking pins 32 and spring-retracted resetting pins 33. The pins 32, 33 are adapted to be engaged by plates 34 secured to posts 35 engaged by arms 36 secured to a shaft 37 oscillated as hereinafter described.

The electromagnets 21 are connected in circuit with a contact make and break device which consists of a metallic drum 38 insulated from the frame 1 and a series of wipers 39. On the drum 38 is placed a jacquard 40 having perforations the arrangement of which is selected according to the pattern it is desired to produce. The drum is rotated step by step through a ratchet wheel 42 and pawl 43 coupled by a link 44 operated by a cam 45 secured to the main driving shaft 46. The circuit is adapted to be broken by a switch 41 operated by a cam 41' on the main driving shaft 46.

The operation of the parts so far described is as follows:—

Figure 1:
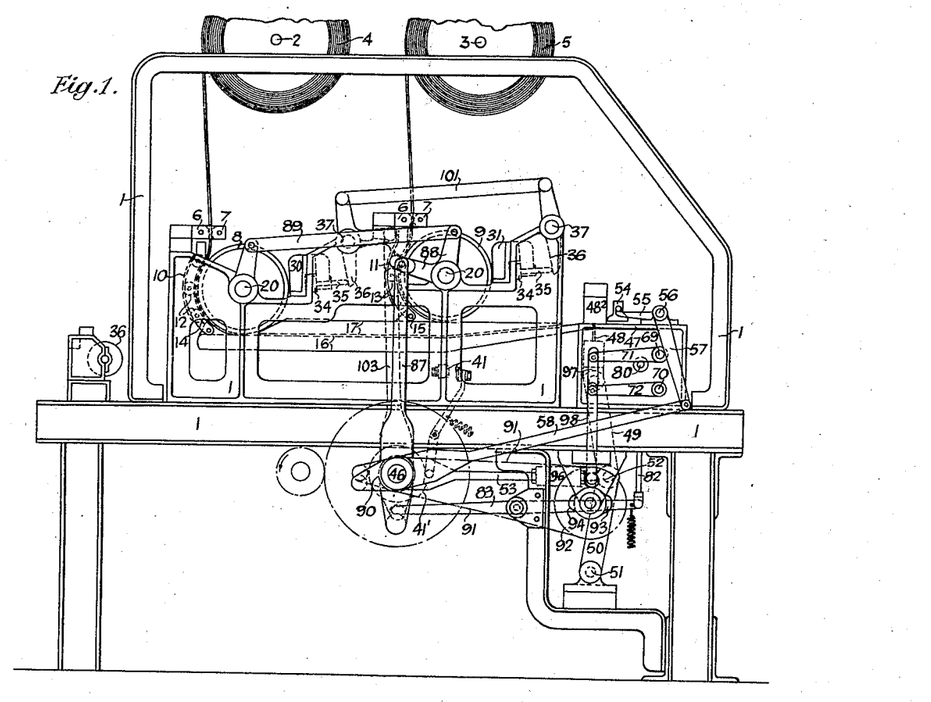
Figure 1 is a side elevation, Figure 2 a plan, Figure 3 a part and sectional elevation and Figures 4 to 11 detail views.
Figure 2:
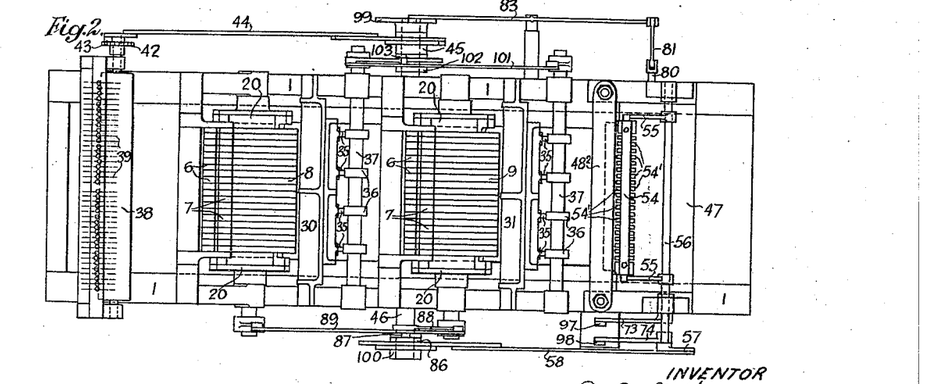
Figure 3:
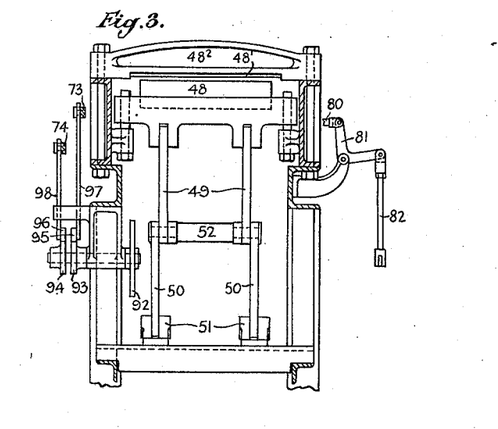
Figure 4:
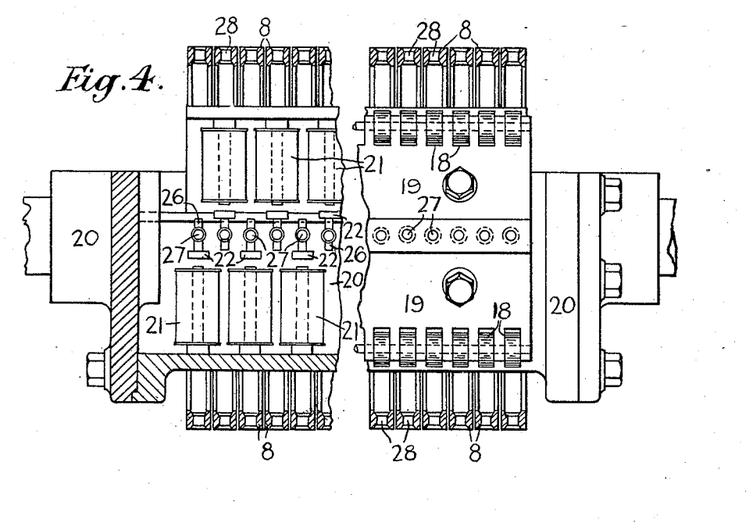
Figure 4 is a longitudinal sectional elevation, Figure 5 a transverse section and Figure 6 a perspective view of the mechanism for selecting which strips are to be fed.
Figure 5:
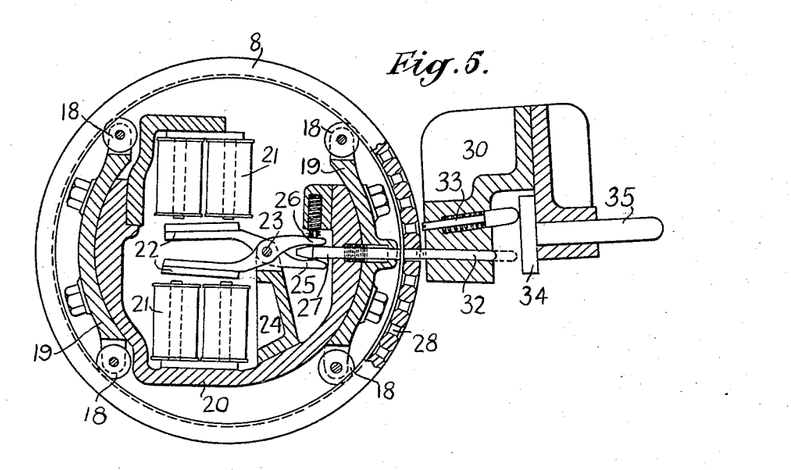
Figure 6:
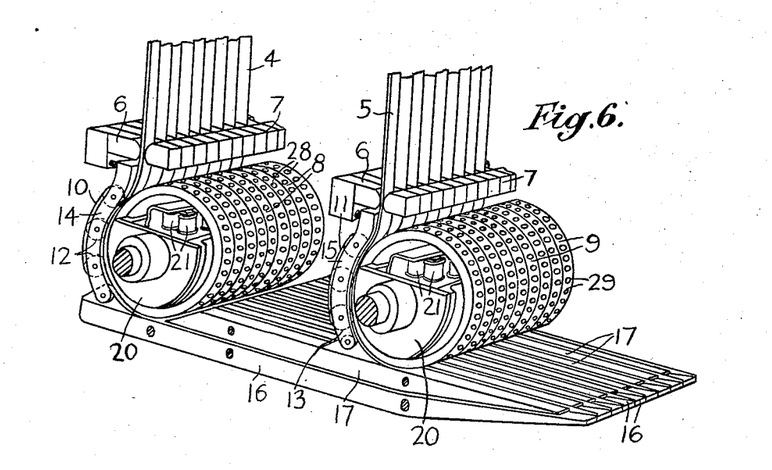

If it be assumed that the circuit of the electromagnets shown in Figure 5 is completed as a result of a perforation in the corresponding part of the jacquard, permitting the corresponding wiper 39 to contact with the drum 38, and that the frame 20 be moving in an anticlockwise direction, the armature 22 is rocked about the pin 23 by the energization of the magnet 21, and as a result the beak 26 moves out of engagement with the shoulder on the pin 27 which latter is urged by its spring into one of the holes 28 in one of the discs 8, at the same time moving the locking pin 32 out of the hole. The anticlockwise movement of the frame 20 is now transmitted to the disc 8, coupled thereto by the pin, and a strip of linoleum is advanced thereby through the guides 16, 17.

When the frame reaches the end of its anticlockwise movement it remains stationary for a period during which the strips are cut as hereinafter described to form the tesserae.

At the end of the period of rest, the frame 20 is moved in a clockwise direction to its original position in two steps with an interval of rest between them. During the first step the pin 27 remains in engagement with and transmits motion to the disc 8. At the end of this first step, the driving pin 27 is opposite the resetting pin 33. The plate 34 is now moved by the arms 36 towards the disk 8 and the resetting pin 33, which is pressed into engagement with the plate 34, is thus moved into engagement with the driving pin 27, and moves it out of engagement with the disk 8, the pin 27 being caught and retained by the beak 26 on the armature 22. The locking pin 32, which is also engaged by the plate 34, is moved thereby into one of the holes in the disc 8, which latter is prevented from further movement. The frame 20 now completes its second step at the end of which the parts are again in the position shown in Figure 5.

Thus the jacquard determines which of the electromagnets shall be energized and hence which of the strips shall be advanced.

Figure 7:
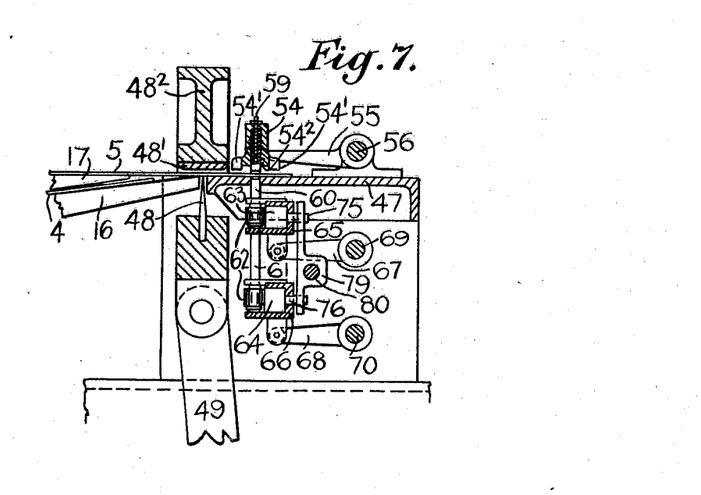
Figures 7 and 8 are sectional elevations at right angles to one another, and Figure 9 a perspective view of the mechanism for turning the tesseræ.
Figure 8:
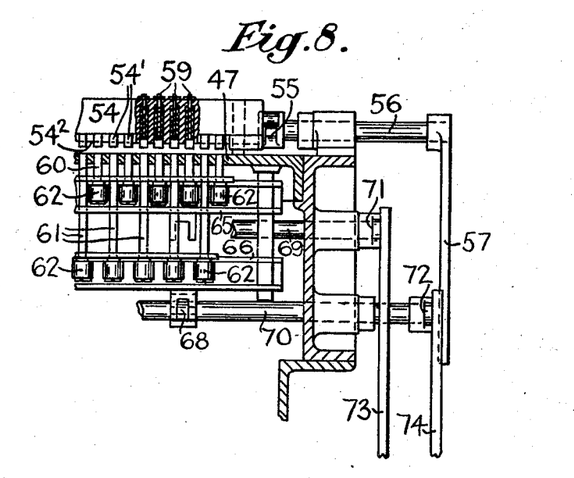
Figure 9:
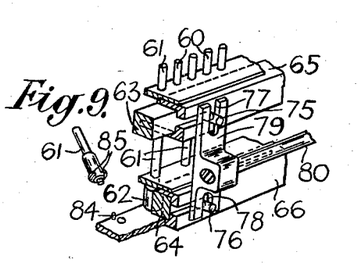
Figure 10:
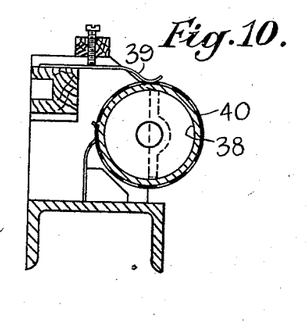
Figure 10 is a sectional elevation of the jacquard selecting device, and Figure 11 a view of a modification of the turning device illustrated in Figure 7.

It will be seen that the strips are fed forwardly a certain distance, and are then withdrawn a smaller distance, the difference between the forward and return movement being equal to the length of the tesserae. The strips are withdrawn a distance such that at the end of the withdrawing operation, the end of the strips lie clear of one another as seen in Figure 7, to permit the next selected strip freely to advance.

At the end of the forward motion of the strips, the tesserae is cut therefrom by the following mechanism. Located a slight distance from the end of the guides is a table 47, and working in the gap thus formed is a guillotine blade 48 adapted to cut against a fibre block 48' carried by a head 48². The guillotine is pivotally connected to one lever 49 of a toggle lever system the other lever 50 of which is pivotally connected at 51 to the bed of the machine. To the common pivotal connection 52 of the toggle levers is connected a rod 53 whose other end is operated by a cam fast with the shaft 46.

In the operation of the cutting device, the guillotine blade 48 is moved upwardly and severs a tessera from the strip. The blade is now withdrawn and the strip is withdrawn as has been described, leaving the cut tessera lying beyond the guillotine blade to be pushed forward by succeeding tesserae to the turning device, hereinafter described.

Every other tessera in one transverse row of tesserae, and tesserae in the next row which alternate with those turned in the first row, are turned through 90° by the following mechanism:—

54 is a presser bar carried by levers 55 secured to a shaft 56 having a lever 57 connected to a rod 58. The presser bar 54 is provided with a series of spring-pressed plungers 59, the number of plungers being equal to the total number of tesseræ in a transverse row and with projecting lugs 54'. Co-operating with the plungers are lifting and rotating plungers arranged in two groups, those in one group being numbered 60 and those in the other group being numbered 61, and the plungers in one group alternating with respect to those in the other group.

The plungers of the upper and lower groups are provided with rubber rolls 62 in engagement with bars 63, 64 respectively, slidably mounted in lifting frames 65, 66, connected to levers 67, 68 fast with shafts 69, 70. The shafts are provided with arms 71, 72 connected to rods 73, 74 actuated in a manner hereinafter referred to. The bars 63, 64 are provided respectively with pins 75, 76 extending into slots 77, 78 formed in a member 79 secured to a rod 80 connected to a bell crank lever 81 connected by a link 82 to a lever 83 oscillated as hereinafter described.

The rotational movement of the plungers is positively limited by fixed pins 84 which extend between the walls of cut-away shoulders 85, the length of the cut-away portions being such as to permit only 90° of movement.

In operation the presser bar 54 is lowered so that the spring-pressed plungers and the projections engage the cut tesseræ. When one or other of the lifting frames 65, 66 is raised, the tesseræ are gripped between the plungers 60 or 61 of the group raised and the corresponding plungers 59 and at the end of the raising operation the tesseræ are turned through 90° by the sliding movement of the bars 63, 64. The transverse tesseræ adjoining the tessera which is turned are held by the corresponding spring-pressed plungers 59 and the longitudinal tesseræ adjoining the said tessera are held by the corresponding projection 54' on the presser bar 54. The presser bar 54 is recessed at 54² to permit the raised tesseral being turned therein. The frame 65 or 66 is now lowered and the presser bar 54 is raised away from the tesseræ, the tesseræ now being forwarded by the next advancing operation of the strips. During the next turning operation, the other frame is raised and since the plungers therein alternate with those in the frame just lifted, the tesseræ which are raised in the next row to be operated on alternate with those raised in the first row.

The movements above described are derived from the main driving shaft 46 in the following manner:—

The frames 20 are oscillated by a cam 86 with which engages a roller carried by a rod 87 pivotally connected to a two-armed lever 88 fast with one of the frames and connected by a link 89 to the other frame.

The shaft 46 is also provided with a chain wheel 90 around which passes a chain 91 which also passes around a chain wheel 92 of twice the diameter of the wheel 90. Fast with the chain wheel 92 are two cams 93, 94 which are 180° out of phase and which engage rollers 95, 96 carried by rods 97, 98 connected to the levers 73, 74 which effect the raising of the frames 65, 66.

Also mounted on the shaft 46 is a cam 99 which engages a roller mounted on the lever 83 to effect the oscillation thereof, and thus through the reciprocation of the bars 63, 64 to effect the rotation of the groups of spindles 60, 61.

The presser bar 54 is lifted by a cam 100 fast with the shaft 46 and engaging a roller mounted on the rod 58.

The shafts 37 for actuating the plates 34 are connected to one another by a link 101 and are rocked by a cam 102 fast on the shaft 46 and engaging a roller on a rod 103.

It will be seen that a machine constructed as herein described effects the following operations:—

(a) Selects which of the strips is to be fed from a plurality of reels;

(b) Advances the strips selected up to a cutter;

(c) Cuts tesseræ from the advanced strip;

(d) Withdraws the uncut strip clear of the tesseræ to permit of the feeding of strips passing through guides one above the other;

(e) Turns every other tessera in one row and alternate tessera in the next row;

(f) Advances the associated tesseræ.

The machine described with reference to Figures 1 to 10 is particularly suitable for use when it is desired to manufacture "tiled" linoleum from strips of linoleum having a longitudinal edging representing the joint between the tiles, the turning of certain of the tesseræ enabling the longitudinal edging to represent the transverse joint between the tiles.

Figure 11:
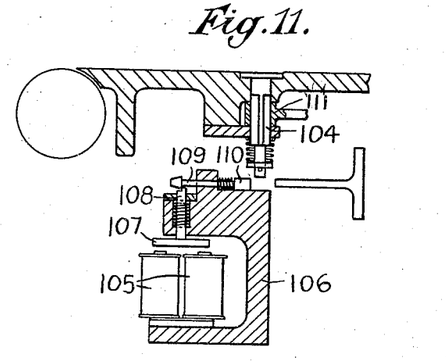

In the modification shown in Figure 11, there is provided means whereby an automatic selection is obtained of the tesseræ to be turned. In the modification the plungers 60, 61 are replaced by spring-loaded plungers 104 whose movements are controlled by electromagnets 105 energized by a circuit controlled by a second jacquard in a similar manner to that described. The magnets are carried in a lifting frame 106 and co-operate with armatures 107 which control spring-loaded latches 108 adapted to retain spring-loaded slides 109 in a position such that blocks 110 on the slides are out of the path of the plunger 104 with which it corresponds. Thus, when the circuits of the electromagnets are completed, the latch 108 is released and the slide 109 moves to the right, as seen in Figure 11, until the block 110 thereon is below the corresponding plunger 104. The rising motion of the frame 106 is now transmitted through the block 110 to the plunger which latter is raised thereby. The plunger is squared to receive an arm or lever 111 which is actuated in any convenient way to rotate the plunger and hence to turn the tesserae.

In cases where it is desired to turn adjacent tesserae, this can be effected by raising the tesserae to different heights by making the blocks 110 of different thicknesses. For example, the first, third and fifth, etc., plungers may be raised an amount a little in excess of the thickness of one tessera, and the second fourth and sixth, etc., a little in excess of the thickness of two tesserae.

Figure 12:
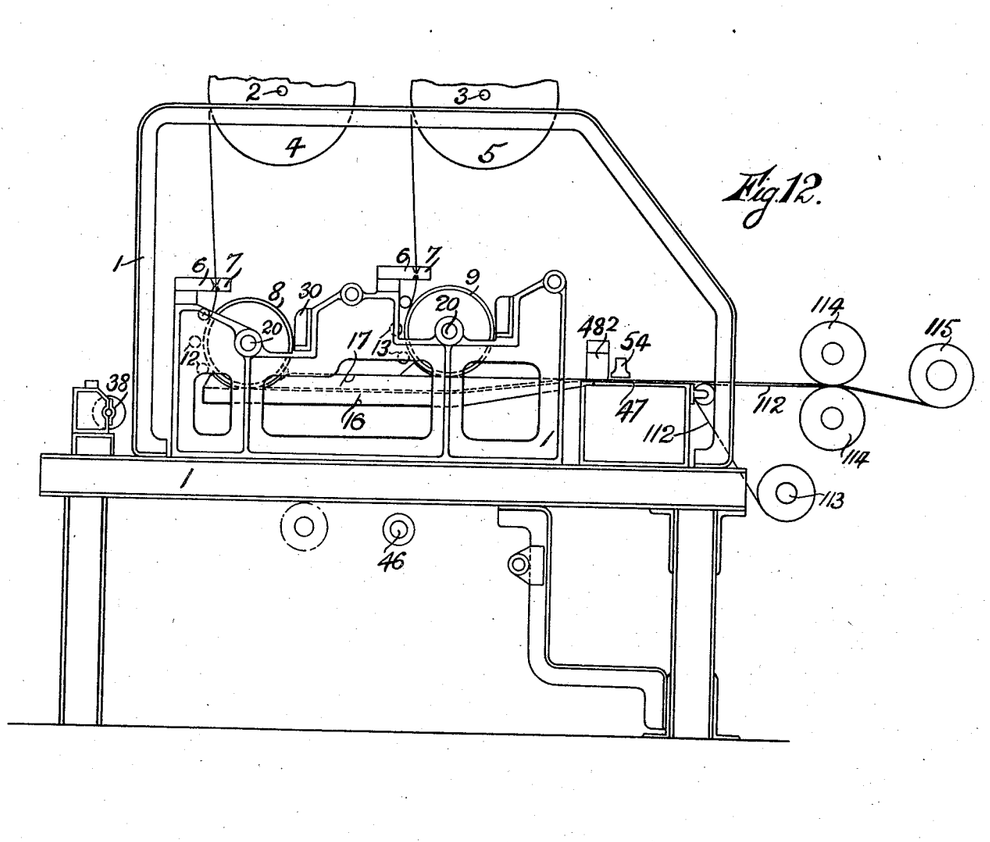
Fig. 12 is an elevation of the machine combined with consolidating rolls.

The tesserae pass from the machine described above on to a travelling backing 112 (see Fig. 12) such as canvas which is unwound from a reel 113 and with which the tesserae are consolidated by pressure excited by rolls 114, the consolidated tesserae and canvas being wound upon a reel 115.

What I claim is:—

1. In a machine for manufacturing linoleum and the like with a patterned surface, the combination of means for feeding a plurality of sections each constituting an element of the pattern, selector means for automatically controlling the feeding of sections and determining the movements of said sections, means for feeding a backing to which the sections are fed, and means for consolidating said sections with the backing.

2. In a machine for manufacturing linoleum and the like with a patterned surface, the combination of means for feeding a plurality of strips of linoleum constituting an element of the pattern, selector means for automatically selecting which of the strips are fed, means for severing sections from the strips, means for feeding a backing to which the severed sections are fed, and means for consolidating the sections with the backing.

3. In a machine for manufacturing linoleum and the like with a patterned surface, the combination of means for feeding a plurality of strips of linoleum constituting an element of the pattern, selector means for automatically selecting which of the strips are fed, means for severing sections from the strips, means for turning sections through an angle in the plane of their faces, means for feeding a backing to which the severed sections are fed, and means for consolidating the sections with the backing.

4. In a machine for manufacturing linoleum and the like with a patterned surface, the combination of means for feeding a plurality of strips of linoleum each adapted to provide an element of the pattern, means for severing sections from the strips, means for turning sections through an angle in the plane of their faces, selector means for automatically selecting which of the strips are fed and which of the sections are turned, means for feeding a backing to which the severed sections are fed, and means for consolidating the sections with the backing.

5. In a machine for manufacturing linoleum and the like with a patterned surface, the combination of means for feeding a plurality of strips of linoleum a given distance and then withdrawing the strips a shorter distance, each strip being adapted to provide an element of the pattern, means for severing sections from the strips at the end of the forward movement, means for feeding a backing to which the sections are fed, and means for consolidating the sections with the backing.

6. In a machine for manufacturing linoleum and the like with a patterned surface, the combination of means for feeding a plurality of strips of linoleum a given distance and then withdrawing the strips a shorter distance, each strip being adapted to provide an element of the pattern, selector means for automatically selecting which of the strips are fed, means for severing sections from the strips at the end of the forward movement, means for feeding a backing to which the sections are fed, and means for consolidating the sections with the backing.

7. In a machine for manufacturing linoleum and the like with a patterned surface, the combination of means for feeding a plurality of strips of linoleum a given distance and then withdrawing the strips a shorter distance, each strip being adapted to provide an element of the pattern, means for severing sections from the strips at the end of the forward movement, means for turning sections through an angle in the plane of their faces, means for feeding a backing to which the sections are fed, and means for consolidating the sections with the backing.

8. In a machine for manufacturing linoleum and the like with a patterned surface, the combination of means for feeding a plurality of strips of linoleum a given distance and then withdrawing the strips a shorter distance, each strip being adapted to provide an element of the pattern, means for severing sections from the strips at the end of the forward movement, means for turning sections through an angle in the plane of their faces, selector means for automatically selecting which of the strips are fed and which of the sections are turned, means for feeding a backing to which the sections are fed, and means for consolidating the sections with the backing.

9. In a machine for manufacturing linoleum and the like with a patterned surface, the combination of means for feeding a plurality of strips of linoleum each adapted to provide an element of the pattern, selector means for automatically selecting which of the strips are fed, means for severing sections from the strips, a plurality of groups of means adapted to raise severed sections, the means in one group being arranged alternately with respect to those in another group, means for operating the groups in alternation, means for turning the sections after they have been raised through an angle in the plane of their faces, means for feeding a backing to which the sections are fed, and means for consolidating the sections with the backing.

10. In a machine for manufacturing linoleum and the like with a patterned surface, the combination of an oscillating member, a plurality of feed members each adapted to feed a strip of linoleum each adapted to provide an element of the pattern, clutches adapted to connect said feed members to said oscillating member, detent means adapted to retain said clutch in its inoperative position, release means for rendering said detents inoperative, selector means for automatically selecting which of said release means are operated, means for rendering said clutches inoperative, means for severing sections from the strips, means for feeding a backing to which the sections are fed, and means for consolidating the sections with the backing.

11. In a machine for manufacturing linoleum and the like with a patterned surface, the combination of an oscillating member, a plurality of feed members each adapted to feed a strip of linoleum each adapted to provide an element of the pattern, clutches adapted to connect said feed members to said oscillating member, detent means adapted to retain said clutch in its inoperative position, electrically operated release means for rendering said detents inoperative, means for automatically and selectively controlling the circuits of said electrically operated release means, means for rendering said clutches inoperative, means for severing sections from the strips, means for feeding a backing to which the sections are fed, and means for consolidating the sections with the backing.

12. In a machine for manufacturing linoleum and the like with a patterned surface, the combination of an oscillating member, a plurality of feed discs having driving surfaces and each adapted to feed a strip of linoleum adapted to provide an element of the pattern, a plurality of driving pins carried by said oscillating member and each adapted to co-operate with the driving surfaces of one feed disc, detents adapted to retain said pins out of operative position, electromagnetically operated means for releasing said detents, means for automatically and selectively controlling the circuits of said electromagnetically operated means, re-setting means adapted to return the driving pins to their detent engaged position, means adapted to position the feed discs as the pins are released therefrom, means for severing sections from the strips, means for feeding a backing to which the several sections are fed, and means for consolidating the sections with the backing.

13. In a machine for manufacturing linoleum and the like with a patterned surface, the combination of an oscillating member, a plurality of feed discs having driving surfaces and each adapted to feed a strip of linoleum adapted to provide an element of the pattern, a plurality of driving pins carried by said oscillating member and each adapted to co-operate with the driving surfaces of one feed disc, detents adapted to retain said pins out of operative position, electromagnetically operated means for releasing said detents, means for automatically and selectively controlling the circuits of said electromagnetically operated means, re-setting means adapted to return the driving pins to their detent engaged position, means adapted to position the feed discs as the pins are released therefrom, means for severing sections from the strips, a plurality of pressure members, a plurality of groups of rotatable members to which the severed sections pass, means for moving the groups of members in alternation towards the pressure members whereby the corresponding sections are gripped between the rotatable members and the pressure members and are moved thereby through an angle in the plane of their faces, means for feeding a backing to which the severed sections are fed, and means for consolidating the sections with the backing.

14. In a machine for manufacturing linoleum and the like with a patterned surface, the combination of an oscillating member, a plurality of feed discs having driving surfaces and each adapted to feed a strip of linoleum adapted to provide an element of the pattern, a plurality of driving pins carried by said oscillating member and each adapted to co-operate with the driving surfaces of one feed disc, detents adapted to retain said pins out of operative position, electromagnetically operated means for releasing said detents, means for automatically and selectively controlling the circuits of said electromagnetically operated means, re-setting means adapted to return the driving pins to their detent engaged position, means adapted to position the feed discs as the pins are released therefrom, means for severing sections from the strips, a plurality of pressure members, a plurality of rotatable members to which the severed sections are fed, a member adapted to move the rotatable members and the pressure members relatively to one another to grip the sections and thereby turn them through an angle in the plane of their faces, electromagnetically operated means adapted to prevent the movement of said member from being transmitted to cause relative movement of the pressure and rotatable members into gripping position, means for automatically and selectively controlling the circuits of said electromagnetically operated means, means for feeding a backing to which the severed sections are fed, and means for consolidating the sections with the backing.

15. In a machine for manufacturing linoleum and the like with a patterned surface, the combination of reel supports adapted to support a plurality of reels of strip linoleum each adapted to provide an element of the pattern, guideways for each of said strips, a cutting mechanism adapted to sever sections from the strips, means for feeding the strips in superposed relation step by step to the cutting mechanism, means for selecting which of the strips are fed, means for selectively turning the sections through an angle in the plane of their faces, means for feeding a backing, and means for consolidating the sections with the backing.

16. In a machine for manufacturing linoleum and the like with a patterned surface, the combination of means for feeding a plurality of strips of linoleum step by step to each of a plurality of feed points, means for selecting which strip is fed at each step and means for cutting sections from the strips to form elements of the pattern.

17. In a machine for manufacturing linoleum and the like with a patterned surface, the combination of means for feeding a plurality of strips of linoleum step by step to each of a plurality of feed points, means for selecting which strip is fed at each step, means for cutting sections from the strips to form element of the pattern, and means for turning the sections selectively through an angle in the plane of their faces.

In testimony that I claim the foregoing as my invention I have signed my name this third day of October, 1929.

ALFRED ARTHUR GODFREY.